(12) United States Patent
Xiong

(10) Patent No.: US 11,815,972 B2
(45) Date of Patent: Nov. 14, 2023

(54) METHOD AND DEVICE FOR CONFIGURING COLD REDUNDANCY OF POWER SOURCE

(71) Applicant: INSPUR SUZHOU INTELLIGENT TECHNOLOGY CO., LTD., Suzhou (CN)

(72) Inventor: Bin Xiong, Suzhou (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/763,427

(22) PCT Filed: Dec. 30, 2019

(86) PCT No.: PCT/CN2019/129986
§ 371 (c)(1),
(2) Date: Mar. 24, 2022

(87) PCT Pub. No.: WO2021/056911
PCT Pub. Date: Apr. 1, 2021

(65) Prior Publication Data
US 2022/0342473 A1 Oct. 27, 2022

(30) Foreign Application Priority Data
Sep. 27, 2019 (CN) .......................... 201910927238.1

(51) Int. Cl.
*G06F 1/30* (2006.01)
*G06F 1/26* (2006.01)

(52) U.S. Cl.
CPC ................ *G06F 1/30* (2013.01); *G06F 1/263* (2013.01)

(58) Field of Classification Search
CPC .................................. G06F 1/30; G06F 1/263
See application file for complete search history.

(56) References Cited

U.S. PATENT DOCUMENTS 10,026,271 B2  7/2018  Toepke et al.
11,334,135 B1 * 5/2022  Wang ..................... G06F 1/263
(Continued)

FOREIGN PATENT DOCUMENTS

CN  101572418 A  11/2009
CN  102290854 A  12/2011
(Continued)

OTHER PUBLICATIONS

China National Intellectual Property Administration (CN/ISA); Written Opinion, PCT/CN19/129986; dated Jun. 23, 2020; pp. 1-2.
(Continued)

*Primary Examiner* — Aurel Prifti
(74) *Attorney, Agent, or Firm* — Taft Stettinius & Hollister LLP; Stephen F. Rost

(57) ABSTRACT

The present disclosure provides a method and device for configuring cold redundancy of a power source. The method includes determining an efficient range and an inefficient range of an efficiency-load curve of a power supply unit (PSU), wherein the efficiency-load curve is acquired by testing the PSU in advance. If the PSU operates in the efficient range when voltage of the PSU is before a preconfigured power source configuration point, or if the PSU operates in the inefficient range when the voltage of the PSU is after the preconfigured power source configuration point, the method includes recalculating the preconfigured power source configuration point. If neither, then the method includes determining that the preconfigured power source configuration point is a power source configuration point, wherein the power source configuration point is a voltage value at which a standby PSU is switched to a power supply PSU when cold redundancy is configured.

4 Claims, 2 Drawing Sheets

---

Determine an efficient range and an inefficient range of an efficiency-load curve of a power supply unit (PSU) — 201

If the PSU operates in the efficient range when a voltage of the PSU is less than a preconfigured power source configuration point, or if the PSU operates in the inefficient range when the voltage of the PSU is greater than the preconfigured power source configuration point, recalculate the preconfigured power source configuration point; and if neither, determine that the preconfigured power source configuration point is a power source configuration point, wherein the power source configuration point is a voltage value at which a standby PSU is switched to a power supply PSU when cold redundancy is configured — 202

(56) References Cited

U.S. PATENT DOCUMENTS

| | | | | |
|---|---|---|---|---|
| 2010/0037078 A1* | 2/2010 | Gross | ............... | G06F 11/3058 |
| | | | | 713/340 |
| 2012/0079321 A1* | 3/2012 | Williams | ............... | G06F 1/30 |
| | | | | 714/14 |
| 2012/0303993 A1* | 11/2012 | Nishtala | ............... | G06F 1/28 |
| | | | | 713/340 |
| 2018/0248381 A1* | 8/2018 | Lewis | ............... | H02J 7/005 |

FOREIGN PATENT DOCUMENTS

| | | |
|---|---|---|
| CN | 103186216 A | 7/2013 |
| CN | 104866061 A | 8/2015 |
| CN | 105339990 A | 2/2016 |
| CN | 106774762 A | 5/2017 |
| CN | 109787291 A | 8/2018 |
| CN | 110147155 A | 8/2019 |

OTHER PUBLICATIONS

China National Intellectual Property Administration (CN/ISA); International Search Report of corresponding application PCT/CN19/129986; dated Jun. 23, 2020; pp. 1-2.

The State Intellectual Property Office of People's Republic of China; The First Office Action; Corresponding Application 201910927238.1; pp. 1-4.

\* cited by examiner

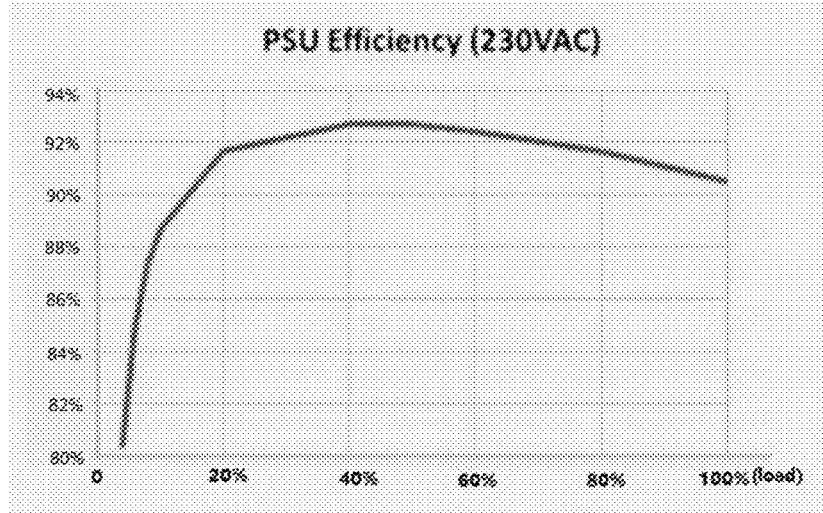

Fig. 1

201 — Determine an efficient range and an inefficient range of an efficiency-load curve of a power supply unit (PSU)

202 — If the PSU operates in the efficient range when a voltage of the PSU is less than a preconfigured power source configuration point, or if the PSU operates in the inefficient range when the voltage of the PSU is greater than the preconfigured power source configuration point, recalculate the preconfigured power source configuration point; and if neither, determine that the preconfigured power source configuration point is a power source configuration point, wherein the power source configuration point is a voltage value at which a standby PSU is switched to a power supply PSU when cold redundancy is configured

Fig. 2

METHOD AND DEVICE FOR CONFIGURING COLD REDUNDANCY OF POWER SOURCE

This application is a U.S. national stage application under 35 U.S.C. § 371 of PCT International Application Serial No. PCT/CN2019/129986, which has an international filing date of Dec. 30, 2019, designates the United States of America, and claims the benefit of CN201910927238.1, which was filed on Sep. 27, 2019, the disclosures of which are hereby expressly incorporated by reference in their entirety.

This application claims priority of Chinese Patent Application No. 201910927238.1, entitled "Method and Device for Configuring Cold Redundancy of Power Source", filed with the Chinese Patent Office on Sep. 27, 2019, which is hereby incorporated in its entirety by reference.

TECHNICAL FIELD

The present disclosure relates to the field of power sources, in particular to a method and device for configuring cold redundancy of a power source.

BACKGROUND

With the development of server technology, the power supply requirements for servers are getting higher and higher, and a redundant power system such as dual power supplies or more power supplies must be used to supply power to an overall server system. A redundant power system usually includes two or more power supply units (PSUs), and the plurality of PSUs carry a system load equally, but this can lead to inefficient power utilization. If an output voltage of one of the PSUs is adjusted so that the PSU carries all the load, the rest PSUs are in a standby state to ensure that when a failure occurs in the power supply PSU, the standby PSUs can successfully receive the load to ensure that the entire power system can be used uninterruptedly, which is a cold redundancy mode.

In practical applications, when an overall server system is powered by a redundant power system, each power source configuration point in a cold redundancy mode is determined by algebraic calculation based on a load current segment by segment, wherein the power source configuration point is a voltage value at which a standby PSU is switched to a power supply PSU. However, after power source configuration points are configured by using the above technical solution, especially for a power supply solution of N+N (N≥2), the control logic of a cold redundant BUS voltage is often confused, resulting in unstable power supply of the overall server system.

SUMMARY

To solve the above problems, the present application provides a method and device for configuring cold redundancy of a power source.

In a first aspect of the present application, a method for configuring cold redundancy of a power source is provided, the method including:
  determining an efficient range and an inefficient range of an efficiency-load curve of a power supply unit (PSU), wherein the efficiency-load curve is acquired by testing the PSU in advance; and
  if the PSU operates in the efficient range when a voltage of the PSU is less than a preconfigured power source configuration point, or if the PSU operates in the inefficient range when the voltage of the PSU is greater than the preconfigured power source configuration point, recalculating the preconfigured power source configuration point; and if neither, determining that the preconfigured power source configuration point is a power source configuration point, wherein the power source configuration point is a voltage value at which a standby PSU is switched to a power supply PSU when cold redundancy is configured.

Optionally, determining an efficient range and an inefficient range of an efficiency-load curve of a power supply unit (PSU) includes:
  acquiring an efficiency maximum point of the PSU on the efficiency-load curve;
  determining a load value of the PSU based on the efficiency maximum point according to the efficiency-load curve; and
  determining a range from 0 to the load value of the PSU as the inefficient range and a range from the load value of the PSU to 100 as the efficient range.

Optionally, recalculating the preconfigured power source configuration point includes:
  recalculating the preconfigured power source configuration point according to a connection point between the efficient range and the inefficient range.

Optionally, recalculating the preconfigured power source configuration point includes:
  recalculating the preconfigured power source configuration point multiple times.

Optionally, the preconfigured power source configuration point is acquired by algebraic calculation based on a load current segment by segment.

Optionally, the power source includes a direct-current power source.

In a second aspect of the present application, a device for configuring cold redundancy of a power source is provided, the device including:
  a test unit, a determination unit and a calculation unit, wherein
  the test unit is configured to test an efficiency-load curve which is acquired by testing a power supply unit (PSU) in advance;
  the determination unit is configured to determine an efficient range and an inefficient range of the efficiency-load curve of the PSU; and
  the calculation unit is configured to, if the PSU operates in the efficient range when the voltage of the PSU is less than a preconfigured power source configuration point, or if the PSU operates in the inefficient range when the voltage of the PSU is greater than the preconfigured power source configuration point, recalculate the preconfigured power source configuration point; and if neither, determine that the preconfigured power source configuration point is a power source configuration point, wherein the power source configuration point is a voltage value at which a standby PSU is switched to a power supply PSU when cold redundancy is configured.

Optionally, the device further includes:
  an acquisition unit configured to acquire an efficiency maximum point of the PSU on the efficiency-load curve.

Compared with the prior art, the above technical solutions of the present disclosure have the following advantages:

A PSU efficiency curve is used as a criterion, and power source configuration points in a cold redundancy mode are determined by algebraically combining an efficiency curve and a load current of a PSU segment by segment. The novel computation idea takes into account retention of threshold redundancy, and ensures correct cold redundant BUS voltage control logic, such that power supply of an overall server system is stable. Furthermore, by referring to the PSU efficiency curve, it effectively guarantees that a PSU module supplying energy to the system can operate in a more preferred efficiency range after a power source configuration point switching operation, thereby reducing a total power loss of the system.

BRIEF DESCRIPTION OF THE DRAWINGS

To more clearly describe technical solutions in the embodiments of the present disclosure or in the prior art, a brief introduction to the drawings for use in description of the embodiments or the prior art will be given below. Obviously, the drawings described below are only some embodiments described in the present disclosure, and to those of ordinary skill in the art, other drawings may also be obtained based on these drawings without creative work.

FIG. 1 is an efficiency-load curve acquired by testing a power source PS-2162-NA (1600 W/12.12V);

FIG. 2 is a flow diagram of a method for configuring cold redundancy of a power source provided in the present disclosure;

DETAILED DESCRIPTION OF THE EMBODIMENTS

Figure 3:
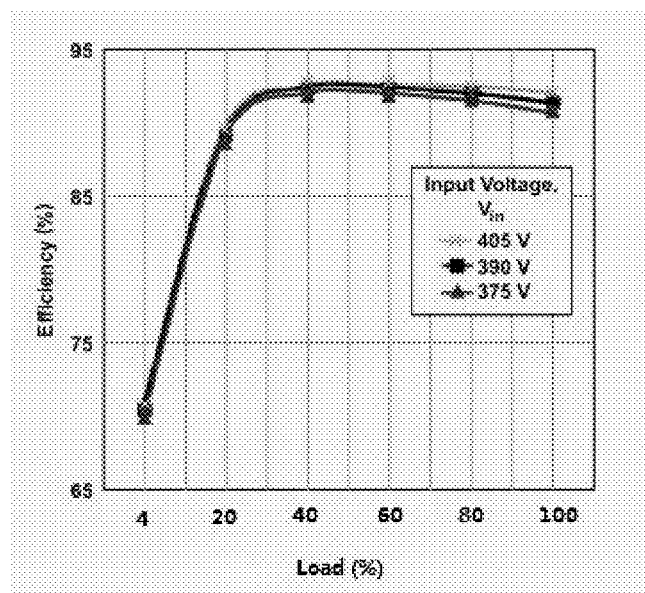
FIG. 3 shows efficiency-load curves of three types of power sources.

To enable those skilled in the art to better understand the solutions of the present disclosure, the technical solutions in the embodiments of the present disclosure will be described below clearly and completely in conjunction with the accompanying drawings in the embodiments of the present disclosure. Obviously, the described embodiments are only a part of the embodiments of the present disclosure, and not all the embodiments. All other embodiments obtained by those of ordinary skill in the art without creative work, based on the embodiments in the present disclosure, fall into the protection scope of the present disclosure.

In practical applications, when an overall server system is powered by a redundant power system, each power source configuration point in a cold redundancy mode is determined by algebraic calculation based on a load current segment by segment, wherein the power source configuration point is a voltage value at which a standby PSU is switched to a power supply PSU. However, after power source configuration points are configured by using the above technical solution, especially for a power supply solution of N+N (N≥2), the control logic of a cold redundant BUS voltage is often confused, resulting in unstable power supply of the overall server system.

In the power supply solution of N+N (N=2), using a power source of specification PS-2162-NA (1600 W/12.12V) as an example, calculation results of power source configuration points in a cold redundancy mode determined by algebraic calculation based on a load current segment by segment for four power sources are shown in Table 1 below.

TABLE 1

Determination of power source configuration points in a cold redundancy mode by algebraic calculation based on a load current segment by segment

| Set point | Itotal(A) | Calculate the Iout | Vshare voltage (V) | Module number before switching | Before switching (%) | Module number after switching | After switching (%) |
|---|---|---|---|---|---|---|---|
| Von2 | 44.88 | 44.88 * 8/(1600/12.12)/1 = 2.72 V | 2.72 | 1 | 34 | 2 | 17 |
| Voff2 | 40.39 | 40.39 * 8/(1600/12.12)/2 = 1.224 V | 1.224 | 2 | 15.29 | 1 | 30.6 |
| Von3 | 163.68 | 163.68 * 8/(1600/12.12)/2 = 4.96 V | 4.96 | 2 | 62 | 3 | 41.33 |
| Voff3 | 148 | 148 * 8/(1600/12.12)/3 = 3 V | 3 | 3 | 37.37 | 2 | 56.06 |
| Von4 | 332.64 | 332.64 * 8/(1600/12.12)/3 = 6.72 V | 6.72 | 3 | 84 | 4 | 63 |
| Voff4 | 300 | 300 * 8/(1600/12.12)/4 = 4.56 V | 4.56 | 4 | 56.82 | 3 | 75.76 |

Using the calculation of Von2 as an example, a set value of the power source of this specification according to power supply characteristics is 8V, and a load current collected is 44.88 A. In this case, only one power source operates, so an ON power source configuration point of PSU2 in the cold redundancy mode is determined to be 2.72V by algebraic calculation based on the load current segment by segment, that is, PSU2 is turned on when the voltage value is greater than 2.72V. Similarly, using the calculation of Voff2 as an example, a set value of the power source of this specification according to power supply characteristics is 8V, and a load current collected is 40.39 A. In this case, two power sources operate, so an OFF power source configuration point of PSU2 in the cold redundancy mode is determined to be 1.224V by algebraic calculation based on the load current segment by segment, that is, PSU2 is turned off when the voltage is less than 1.224V, and so on.

In determination of the power source configuration points in the cold redundancy mode by algebraic calculation based on the load current segment by segment, the voltage control logic can be confused, such as for the voltage of 4.96V of Von3 and the voltage of 4.56 of Voff4 in the above example. Specifically, if the voltage is 4.8V at that time, two power sources PSU1 and PSU2 should operate, and when the voltage rises to 4.96V, three power sources PSU1, PSU2 and PSU3 should operate, and when the voltage rises to 6.72V, four power sources PSU1, PSU2, PSU3 and PSU4 should operate. However, when the voltage drops to 4.96V again, the four power sources PSU1, PSU2, PSU3 and PSU4 should operate, and when the voltage drops to 4.8V, the four power sources PSU1, PSU2, PSU3 and PSU4 should operate, and when the voltage drops to 4.56V, the three power sources PSU1, PSU2 and PSU3 should operate, so it is not clear how many power sources operate at the voltage of 4.8V. Obviously the voltage logic is confused due to the voltage of 4.96V of Von3 and the voltage of 4.56V of Voff4.

The determination of the power source configuration points in the cold redundancy mode by algebraic calculation based on the load current segment by segment not only leads to confusion of the voltage control logic, but also results in that after a power switching operation, a PSU operates in an extremely inefficient range, especially in a light-load situation. An efficiency-load curve acquired by testing the power source PS-2162-NA (1600 W/12.12V) is shown in FIG. 1.

As can be seen from FIG. 1, the PSU performs best in the range of 20%-80% of load, but the efficiency is very low when it operates in the range of 0-20% or 80%-100%, so operation of the PSU in the range below 20% or above 80% should be avoided as much as possible. The range below 20% or above 80% for efficiency is called an inefficient range, and the other range can be called an efficient range, and operation of the PSU in the inefficient range should be avoided as much as possible. In conjunction with Table 1, the efficiency of Von2 is 34% before switching, and the efficiency becomes 17% after a switching operation, that is, after the implementation of a power source configuration point switching operation, the PSU which has been operated in the efficient range starts to operate in the inefficient range, which can increase a power loss.

Based on this, the applicant provides a method for configuring cold redundancy of a power source, in which a PSU efficiency curve is used as a criterion, and power source configuration points in a cold redundancy mode are determined by algebraically combining the efficiency curve and a load current of a PSU segment by segment. The novel computation idea takes into account retention of threshold redundancy, and ensures correct cold redundant BUS voltage control logic, such that power supply of an overall server system is stable. Furthermore, by referring to the PSU efficiency curve, it effectively guarantees that a PSU module supplying energy to the system can operate in a more preferred efficiency range after a power source configuration point switching operation, thereby reducing a total power loss of the system.

Referring to FIG. 2, which is a flow diagram of a method for configuring cold redundancy of a power source provided in the present application.

201: Determining an efficient range and an inefficient range of an efficiency-load curve of a power supply unit (PSU), wherein the efficiency-load curve is acquired by testing the PSU in advance.

Still using the power source PS-2162-NA (1600 W/12.12V) as an example, first the PSU is tested to obtain its efficiency-load curve, i.e., the efficiency-load curve of PS-2162-NA (1600 W/12.12V). As can be seen from FIG. 1, the PSU performs best in the range of 20%-80% of load, but the efficiency is very low when it operates in the range of 0-20% or 80%-100%, so operation of the PSU in the range below 20% or above 80% should be avoided as much as possible. The range below 20% or above 80% for efficiency is called an inefficient range, and the other range can be called an efficient range, and operation of the PSU in the inefficient range should be avoided as much as possible.

202: if the PSU operates in the efficient range when a voltage of the PSU is less than a preconfigured power source configuration point, or if the PSU operates in the inefficient range when the voltage of the PSU is greater than the preconfigured power source configuration point, recalculating the preconfigured power source configuration point; and if neither, determining that the preconfigured power source configuration point is a power source configuration point, wherein the power source configuration point is a voltage value at which a standby PSU is switched to a power supply PSU when cold redundancy is configured.

Still using the power supply solution of N+N (N=2), and a power source of specification PS-2162-NA (1600 W/12.12V) as an example, calculation results of power source configuration points in a cold redundancy mode determined by algebraic calculation based on an efficiency-load curve and a load current of a PSU segment by segment are shown in a table below.

TABLE 2

Determination of power source configuration points in a cold redundancy by algebraic calculation based on an efficiency-load curve and a load current of a PSU segment by segment

| Set point | Itotal(A) | Calculate the Iout | Vshare voltage(V) | Module number before switching | Before switching (%) | Module number after switching | After switching (%) |
|---|---|---|---|---|---|---|---|
| Von2 | 53.13 | 53.13 * 8/(1600/12.12)/1 = 3.22 V | 3.22 | 1 | 40.25 | 2 | 20.13 |
| Voff2 | 50.16 | 50.16 * 8/(1600/12.12)/2 = 1.52 V | 1.52 | 2 | 19 | 1 | 38 |
| Von3 | 170 | 170 * 8/(1600/12.12)/2 = 5.15 V | 5.15 | 2 | 64.39 | 3 | 42.9 |
| Voff3 | 163.35 | 163.36 * 8/(1600/12.12)/3 = 3.3 V | 3.3 | 3 | 27.75 | 2 | 41.63 |
| Von4 | 350 | 350 * 8/(1600/12.12)/3 = 7.07 V | 7.07 | 3 | 88.4 | 4 | 66.3 |
| Voff4 | 343.2 | 343.2 * 8/(1600/12.12)/4 = 5.2 V | 5.2 | 4 | 65 | 3 | 86.6 |

In conjunction with FIG. 1, it can be seen that if the preconfigured power source configuration point is 2.72V, there will be a problem that the PSU operates in the efficient range (34%) when the voltage of the PSU is before the preconfigured power source configuration point, and the PSU operates in the inefficient range (17%) when the voltage is after the preconfigured power source configuration point, Thus, the preconfigured power source configuration point should be recalculated in this case. Calculation shows that when the load current is 53.13 A, the preconfigured power source configuration point is 3.22V, and calculation shows that the PSU operates in the efficient range (40.25%) when the voltage of the PSU is before the preconfigured power source configuration point, and the PSU operates in the inefficient range (20.13%) when the voltage is after the preconfigured power source configuration point, and in this this case, the preconfigured power source configuration point of 3.22V is determined to be the power source configuration point, and so on.

In determination of the power source configuration points in the cold redundancy mode by algebraic calculation based on the efficiency-load curve and the load current of the PSU segment by segment, the problem of logic confusion, such as for the voltage of 5.15V of Von3 and the voltage of 4.56V of Voff4 in the above example, does not occur. Specifically, in this example, PSU2 is off at a voltage of 1.52V and on at a voltage of 3.22V; PSU3 is off at a voltage of 3.3V and on at a voltage of 5.15V; and PSU4 is off at a voltage of 5.2V and on at a voltage of 7.07V. The on the off of the above-mentioned PSUs do not lead to the problem of voltage logic confusion. Moreover, after the power switching operation, there will be no problem that the PSU operates in an extremely inefficient range, and the power loss will not increase.

It is to be noted that as can be seen from FIG. 3, which shows efficiency-load curves of other three types of power sources, each efficiency curve varies with a load, with a tendency of low to high variation as the load changes from light to heavy (full load), and starts to fall after reaching a high point. The corresponding efficiency-load curve can be tested for a specific PSU to obtain an efficiency maximum point of about 30% of the PSU in the whole range, and thus the range of 0-30% is determined to be the inefficient range and the range of 30%-100% is determined to be the efficient range.

It is to be noted that the preconfigured power source configuration point can be recalculated according to the connection point of 30% between the efficient range and the inefficient range, and the recalculation may be carried out multiple times until the phenomenon that the PSU operates in the efficient range when the voltage of the PSU is before the preconfigured power source configuration point, and the PSU operates in the inefficient range when the voltage is after the preconfigured power source configuration point does not occur.

It is to be noted that the method of determining the efficient range and the inefficient range is not limited, and all other embodiments obtained by those of ordinary skill in the art without creative work fall into the protection scope of the present disclosure.

It is to be noted that the preconfigured power source configuration point may be acquired by algebraic calculation based on a load current segment by segment.

It is to be noted that the power source in the present application may be a direct-current power source.

Based on the method provided by the above embodiment, an embodiment of the present disclosure further provides a corresponding device, the operating principle of which will be described in detail below in conjunction with the accompanying drawings.

Device Embodiment

Figure 4:
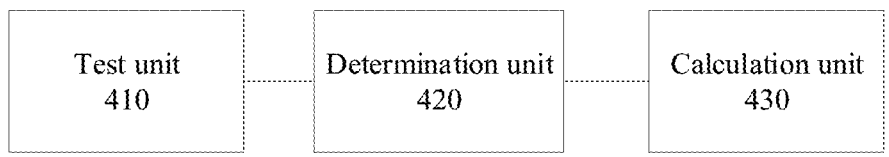
FIG. 4 is a structural diagram of a device for configuring cold redundancy of a power source provided in the present disclosure.

Referring to FIG. 4, which is a structural diagram of a device for configuring cold redundancy of a power source provided in the present application. As shown in FIG. 4, the device may include the following units:

a test unit 410, a determination unit 420 and a calculation unit 430, wherein the test unit 410 is configured to test an efficiency-load curve which is acquired by testing a power supply unit (PSU) in advance;

the determination unit 420 is configured to determine an efficient range and an inefficient range of the efficiency-load curve of the PSU; and the calculation unit 430 is configured to, if the PSU operates in the efficient range when the voltage of the PSU is less than a preconfigured power source configuration point, or if the PSU operates in the inefficient range when the voltage of the PSU is greater than the preconfigured power source configuration point, recalculate the preconfigured power source configuration point; and if neither, determine that the preconfigured power source configuration point is a power source configuration point, wherein the power source configuration point is a voltage value at which a standby PSU is switched to a power supply PSU when cold redundancy is configured.

It is to be noted that the device further includes: an acquisition unit configured to acquire an efficiency maximum point of the PSU on the efficiency-load curve.

The embodiments in the specification are described in a progressive manner. For the same and similar parts between the embodiments, reference may be made to each other. Each embodiment focuses on differences from other embodiments. In particular, a device embodiment, which is substantially similar to a method embodiment, is therefore described relatively simply, and for relevant parts, reference ca be made to part of description of the method embodiment. The device embodiment described above is merely schematic, wherein units and modules described as separate components may be or may be not physically separate. In addition, it is also possible to select some or all of the units and modules as needed actually to achieve the object of the solution of the embodiment. This can be understood and implemented by those of ordinary skill in the at without creative work.

Described above are only specific implementations of the present disclosure, and it should be noted that those of ordinary skill in the art can also make a number of improvements and modifications without departing from principles of the present disclosure, and these improvements and modifications should also be encompassed within the protection scope of the present disclosure.

The invention claimed is:

1. A method for configuring cold redundancy of a power source, comprising:
   determining an efficient range and an inefficient range of an efficiency-load curve of a power supply unit (PSU), wherein the efficiency-load curve is acquired by testing the PSU in advance; and
   in response to a first case that the PSU operates in the efficient range when a voltage of the PSU is less than a preconfigured power source configuration point, or the PSU operates in the inefficient range when the voltage of the PSU is greater than the preconfigured power source configuration point, recalculating the preconfigured power source configuration point;
   in response to a second case that the PSU operates in the inefficient range when a voltage of the PSU is less than a preconfigured power source configuration point, and the PSU operates in the efficient range when the voltage of the PSU is greater than the preconfigured power source configuration point, the preconfigured power source configuration point is determined as a power source configuration point;
   wherein the power source configuration point is a voltage value at which a standby PSU is switched to a power supply PSU when cold redundancy is configured, and
   the determining an efficient range and an inefficient range of an efficiency-load curve of a power supply unit (PSU) comprises:
   acquiring an efficiency maximum point of the PSU on the efficiency-load curve;
   determining a load value of the PSU based on the efficiency maximum point according to the efficiency-load curve; and determining a range from 0 to the load value of the PSU as the inefficient range and a range from the load value of the PSU to 100% as the efficient range.

2. The method according to claim 1, wherein, the recalculating the preconfigured power source configuration point comprises:

recalculating the preconfigured power source configuration point according to a connection point between the efficient range and the inefficient range.

3. The method according to claim 1, wherein, the preconfigured power source configuration point is acquired by algebraic calculation based on a load current segment by segment.

4. The method according to claim 1, wherein, the power source comprises a direct-current power source.

\* \* \* \* \*